March 22, 1966  J. M. CUNNINGHAM  3,241,480
PRINT HAMMER MECHANISM AND PRESSURE CONTROL
MEANS IN HIGH SPEED PRINTERS
Filed March 28, 1963  6 Sheets-Sheet 1

INVENTOR
JAMES M. CUNNINGHAM
BY John S. Jasper
ATTORNEY

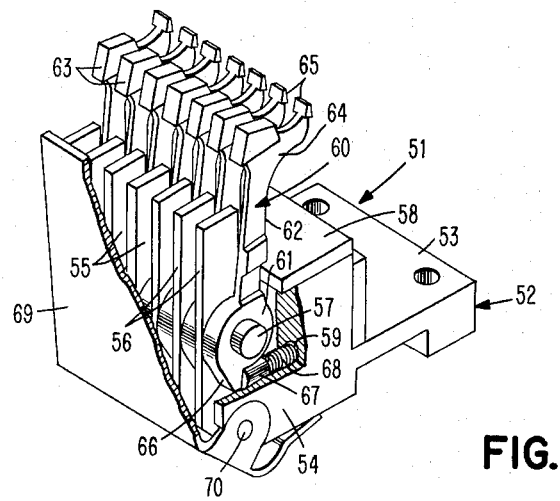
FIG. 6
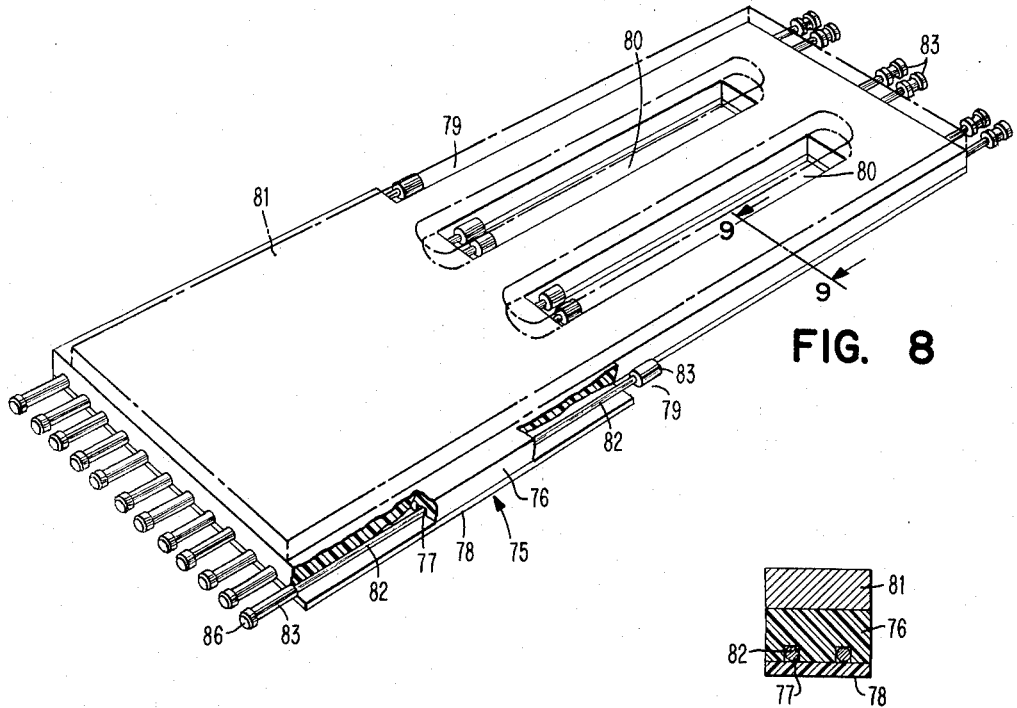
FIG. 8
FIG. 9

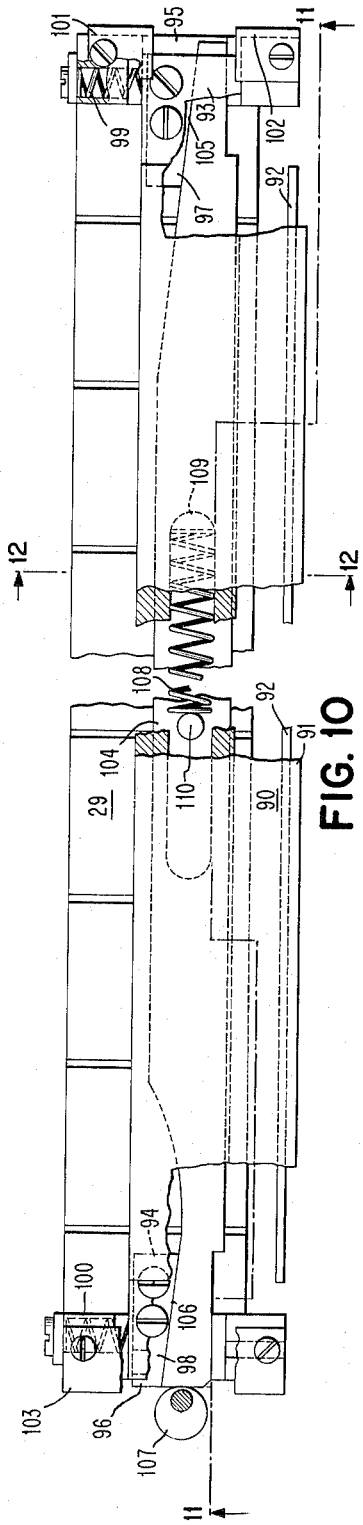
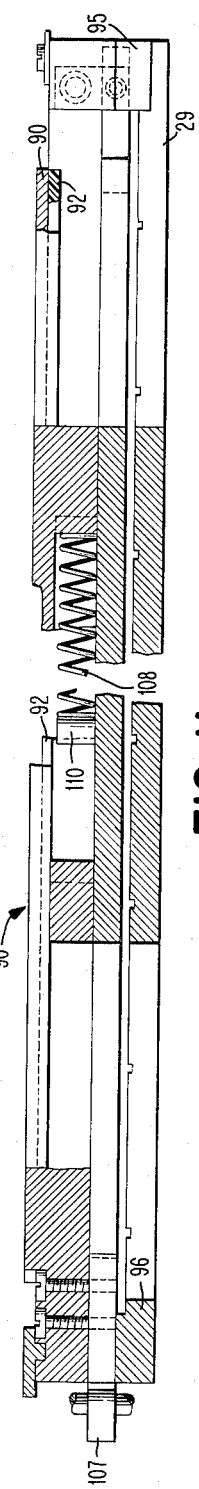
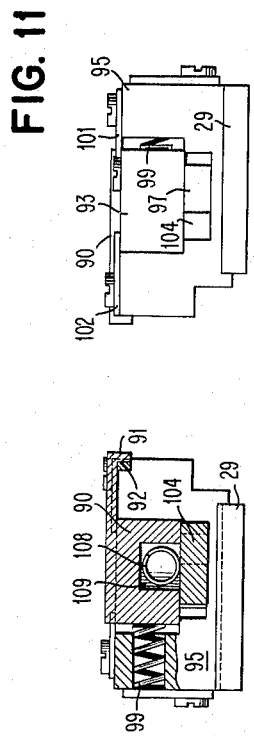
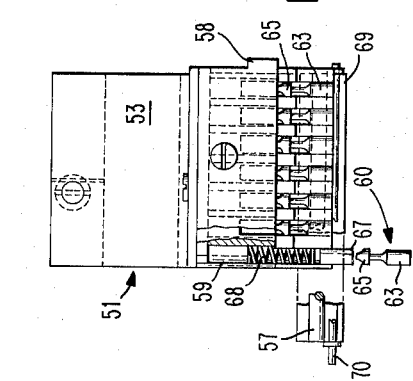

3,241,480
PRINT HAMMER MECHANISM AND PRESSURE
   CONTROL MEANS IN HIGH SPEED PRINTERS
James M. Cunningham, Endwell, N.Y., assignor to International Business Machines Corporation, New York, N.Y., a corporation of New York
Filed Mar. 28, 1963, Ser. No. 268,652
18 Claims. (Cl. 101—93)

This invention relates to printing and more particularly to a print hammer mechanism and assembly for a high speed printer. While not necessarily limited thereto, the subject invention has particular utility in connection with an on-the-fly back printer of the type shown in U.S. Patent 2,993,437, issued to F. M. Demer and E. J. Grenchus on July 25, 1961.

In general, one feature of the on-the-fly back printer is that printing occurs while the type are moving preferably at a constant speed relative to a print line along which printing is to occur. A second feature of the above-mentioned printer is that the print medium is impacted by hammer means against the moving type. The hammer means generally comprises hammer striking elements located at each print position along the print line. The hammer elements are selectively operated under control of circuit means which identifies the type characters as they arrive at various print positions and a storage means which indicates what characters are to be printed at the various locations. When the type tracking means and the storage means are each calling for the same character at a particular position, the hammer element at that print position is fired. When all the hammer devices are fired at all the positions specified by the storage mechanism, the print cycle is complete, the print medium is advanced to a new line position and the print process may be repeated.

In on-the-fly printers in general it is essential for good print quality that the impact of the print medium against the type characters occur at the precise instant when the moving type characters are registered with the print location at which striking occurs. An early or late impact results in partial printing or a displacement of the imprint along the line of travel of the type which therefore provides poor print quality.

One type of print hammer mechanism used in high speed back printers operates on an inertia principle. In such mechanisms, an activator, such as an electromagnet or the like, hurls a hammer element from a position of rest against a print medium into impact against the moving type characters. At the instant of impact, the hammer element is moving under its own momentum. For a short interval, the hammer element is in contact against the struck elements and then rebounds to the retracted rest position where it is retained for subsequent reactivation.

The clarity and sharpness of the imprint formed on the print medium by the above type of inertial hammer mechanism in part depends on the impact duration. If the duration of contact with the type characters is extensive, the imprint will be blurred since the type elements are in motion at the time of impact. The duration of impact, in turn, depends, among other things, on the velocity of the hammer element at the time of impact. For a given activator of given energy level the velocity of the hammer element is increased inversely to its mass. Impact duration time may be reduced by reducing the mass of the hammer element and increasing its velocity.

Present inertial print hammer mechanisms, in general, have had mass characteristics which imposed a serious limit on the speed of on-the-fly back printers. In addition the interoperative relation of the hammer mechanism parts have dissipated energy from the activator or failed to operate in a repeatedly uniform manner. To obtain greater output speeds, of course, the velocity of the type characters relative to the strike elements must be increased. Correspondingly, the impact duration of the hammer element must be made shorter to avoid the loss in print quality. In addition, energy dissipating operative connections must be eliminated if increased operative efficiency and improved print quality are to be achieved.

It is a particular object of the present invention to provide an improved inertial print hammer mechanism useful in printer apparatus capable of realizing higher output speeds and improved print quality.

It is also an object of the present invention to provide an improved inertial print hammer mechanism in accordance with the preceding object in which the higher speeds can be realized without sacrificing print quality and in which the construction of the print hammer mechanism is relatively simple and easy to manufacture.

In high speed on-the-fly printers designed for line printing, a print hammer mechanism is provided at each print position along the line. Common standard line lengths consist of 120 or 132 print positions where the print positions are spaced 0.10 inch. The assembly of a plurality of individually operable print hammer mechanisms for such a large number of print positions at such space dimensions generally involves a substantially complex mechanical arrangement. Repair and replacement as well as maintenance of operating parts can become a time consuming activity which reduces the overall operating efficiency and effectiveness of the printer apparatus.

Consequently, it is a further object of this invention to provide an improved print hammer mechanism assembly for a high speed on-the-fly line printer which is considerably simplified over previous assemblies and which affords greater precision in mounting and adjustment interchangeability of parts and in which each of the print hammer mechanisms and component parts may be easily assembled or disassembled for repair and maintenance.

It is desirable to provide an impression control means for all the hammer elements of the print hammer mechanism assembly. Such control means should be easily adjustable to accommodate various thickness in the document being struck against the moving type and such a control means should be readily adjustable in uniform manner for all print hammer elements. It is a still further object to provide an improved impression control means which is part of the multiple print hammer mechanism assembly and realizes all of the above objectives and which is easily manufactured, assembled and operated as part of the print hammer mechanism assembly.

The above as well as other objectives and advantages are realized in accordance with the practice of the present invention by providing a print hammer mechanism comprising an inertial hammer element and an impeller unit operatively connected thereto by a push connector. In accordance with this invention, the push connector comprises a wire element movably supported by a guide support in intermediate position and with the ends thereof in abutting relation with the impeller unit and the hammer element. In accordance with this invention the mass of the mechanism is greatly reduced by using a wire element which takes the form of a slender column. By definition a slender column is a column whose slenderness ratio, consisting of the radius of gyration/length, is greater than 120. The support member in addition to guiding the wire element also serves to maintain the slender column substantially rigid throughout its stroke thereby preventing loss of substantial energy being transmitted by the connector to the print element.

In the preferred form the print hammer mechanism more specifically comprises an electromagnet comprising a core, an energizing coil and thrust armature pivotally mounted at one end thereof. Thrust motion is imparted by the coil acting thereon with attraction force at a point intermediate the pivot and free end of the armature. The striking element is a print hammer arm pivotally mounted proximate one end and carrying an anvil proximate the free end thereof. It is a feature of the print hammer mechanism construction that a velocity amplifier arrangement be provided between the electromagnet armature and the hammer element whereby increased velocity of the hammer element for impacting the type is obtained. For that purpose, the armature and hammer elements are both lever arms with the armature lever being substantially greater in length than the hammer lever arm. In addition, the push connector transmits motion from the free end of the armature to a point intermediate the pivot of the hammer element and the anvil. In such an arrangement the velocity of the armature is amplified in the hammer element. Further increase in the velocity is realized for a given electromagnet by using a slender column push connector and using a guide support which maintains the connector in columnar abutment with the electromagnet and the hammer element. By supporting the push connector slender column in a manner which prevents lateral bending without limiting axial motion, little energy from the electromagnet is dissipated and because of the low mass realized from the use of a slender column less energy is required from the electromagnet to impart high velocity to the hammer element. Improved operating characteristics are realized by providing a support member which utilizes low friction plastic materials for slidingly supporting the push connector. By virtue of the columnar abutting relation and support of the slender column by a stationary intermediate support in sliding fashion without lateral bending, the interconnection of the column is maintained relatively free of defects and energy losses due to binding and changing conditions are eliminated. Further improvement is realized by equipping the slender column with wear members attached to the ends thereof including rubber blocks for contacting the armature and hammer element surfaces. A particularly suitable rubber material was found to be polyurethane. The wear members afford a ready means for controlling masses of slender columns of different sizes in multiple hammer assembly.

Additional advantage is obtained by constructing the hammer element so that its center of mass is nearer the center of impact which is the anvil. In addition to making the anvil relatively massive, the arm carrying the anvil is designed to have a section directly behind the anvil and terminating in a hook portion which extends outwardly from the anvil and which serves the further purpose of engaging an impression control member.

In the multiple print hammer mechanism assembly feature of the present invention, plural hammer mechanisms of the above-described type are mounted on a unitary frame with the plural hammer elements arranged in a single row, each hammer element being connected to an individual electromagnet by a slender column push connector. It is a feature of the print hammer mechanism assembly that the plural hammer elements are mounted in subgroups in individual hammer modules. Each hammer module comprises a frame member which pivotally supports the hammer elements of the subgroup on a common axis and is aligned array. Plural hammer modules are mounted on the frame assembly individually to form plural aligned subgroups of hammer elements.

To utilize space more effectively the electromagnets are mounted on the assembly frame in parallel front and rear and upper and lower rows. Specifically the electromagnets are arranged so that their armatures are arranged in two laterally displaced rows with the armatures being spaced longitudinally so that adjacent electromagnets in a row have their armatures separated by the space equal to four print positions, with the intermediate print positions being occupied by armatures at upper or lower levels at forward and rearward operating positions.

The plurality of interconnecting slender column push connectors for the various hammers and electromagnet armatures are also divided into subgroups. Each subgroup of push connectors comprises a predetermined arrangement of short and long push connectors to effect interconnection of the hammer elements to armatures in the previously described forward and rear rows. A support block and cover plate having channel and window configurations for receiving the armatures in the various rows carry the push connectors in freely movable abutting connection with the armatures and print hammers and form a connector module assembly easily mounted on the assembly frame intermediate the coacting operating elements.

An impression control mechanism mounted on the assembly frame includes a single impression control bar comprising a compression means positioned to be engaged by the hook portions of all the hammer elements along the print line. The impression control bar moves in direction in-line with the motion of the print hammer elements. Adjustment of the in-line position of the control bar for engagement at variable positions by the print hammers is obtained by an adjustor plate movably mounted on the hammer assembly frame proximate the control bar in a direction longitudinally of the print line. The conversion of the longitudinal motion of the adjustor plate to the transverse motion of the impression control bar is attained by use of interacting transverse displacement cams formed on the control bar and plate members. A spring member connected to the adjustor plate and control bar biases the adjustor plate in a first longitudinal direction against a single rotatable adjustment cam. Second spring means biases the control bar in a direction which maintains the motion conversion cam means of the adjustor plate and control bar in continuous contact. It will be appreciated that an adjustable impression control mechanism has been provided which is relatively simple and which readily is adapted for inclusion into the assembly of the plural print hammer mechanisms.

The foregoing and other objects, features and advantages of the invention will be apparent from the following more particular description of preferred embodiments of the invention as illustrated in the accompanying drawings.

In the drawings:

FIG. 6 is an isometric view of the print hammer module assembly used in the hammer mechanism assembly of FIG. 2.

FIG. 7 is a plan view of the print hammer module of FIG. 6 with portions taken in cross section to illustrate details of construction.

FIG. 8 is an isometric view showing the push connector module assembly used with the print hammer module assembly of FIG. 6 in the print hammer mechanism assembly of FIG. 2.

FIG. 9 is a section of a portion of the push connector module of FIG. 8 taken along section line 9—9 in FIG. 8.

FIG. 10 is a plan view of the impression control mechanism of the print hammer mechanism assembly of FIG. 2.

FIG. 11 is a cross section in elevation of the impression control mechanism shown in FIG. 10 taken along the section line 11—11.

FIG. 12 is a cross section in elevation of the impression control adjustment mechanism of FIG. 10 taken along the section line 12—12.

FIG. 13 is an elevation view of the impression control assembly of FIG. 10 taken from the right end.

Figure 1:
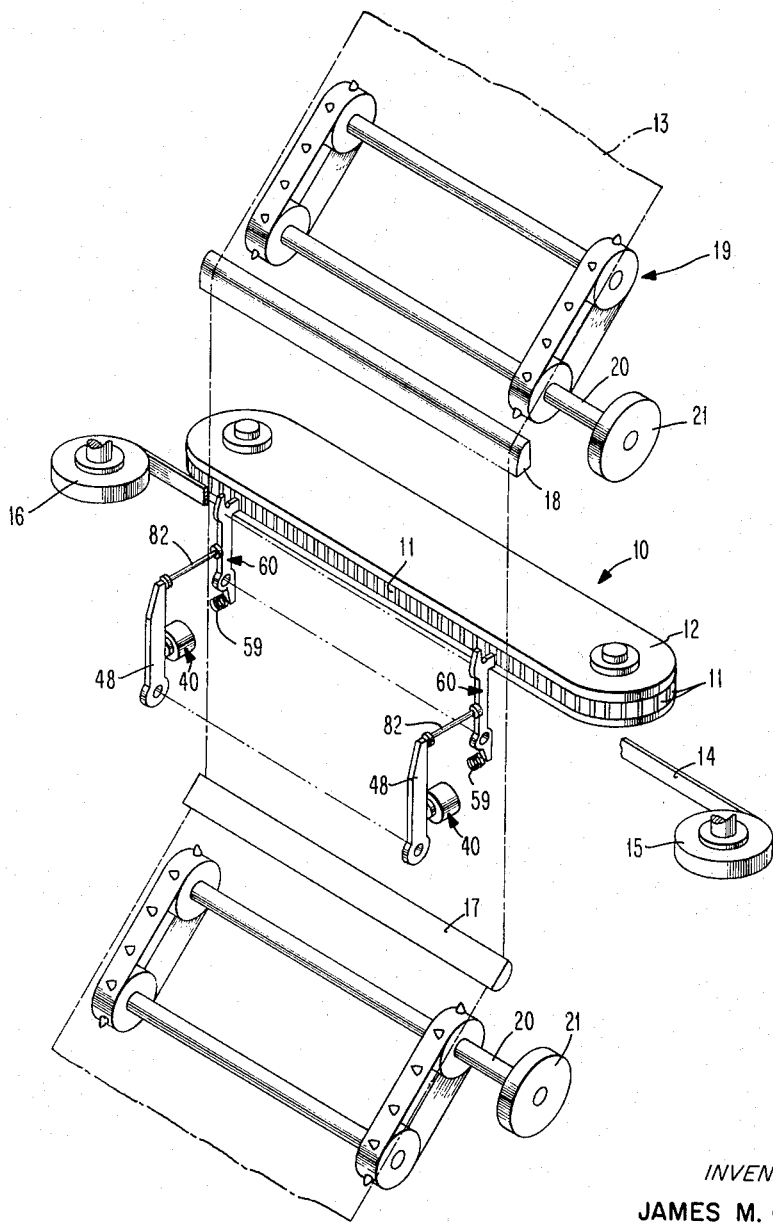
FIG. 1 is a schematic showing of a printer apparatus adapted for using the print hammer mechanism and assembly of the present invention.

Referring to the drawings:

FIG. 1 shows a printer apparatus of one type for using the present invention and comprises a type carrier 10 having a plurality of individual type elements 11 movable in a continuous path on a stationary frame 12. A portion of the path of motion of the type elements 11 includes a forward straight portion along which printing can occur and which hereinafter is referred to as the print line. Each type element 11 has one or more different engraved characters on the front surface thereof. Plural sequences of type characters are obtained by assembling the type elements in predetermined arrangement on the frame 12. The type elements 11 are driven preferably in the form of a train along the frame 12 so that they travel at constant velocity and so that they are maintained in abutting relation along the front straight print line portion of the path of travel. In such manner the type characters are maintained in uniformly spaced relation throughout the region in which printing will occur. The specific construction of the drive means and the connection of the type elements thereto as well as details of construction of the movement of the type elements 11 in the closed path and along the straightforward portion thereof may be more fully understood by reference to my copending application for a Type Carrier Device, Serial No. 268,757, filed concurrently herewith on March 28, 1963 and assigned to a common assignee.

The printer apparatus of FIG. 1 is a back printer and in accordance with well known operational principles thereof, a paper document 13 is positioned behind an ink ribbon 14 or the like which in turn is positioned immediately adjacent the type elements 11 over the print line portion thereof. The ink ribbon 14 may be fed in a suitable manner between spools 15 and 16 along the line of travel of the type elements. The paper document 13, however, is fed transversely to the direction of motion of the type. Guide bars 17 and 18 and forms feed tractors 19 coact to support and move the paper document 13 in the proper line of travel. In the preferred form, printing occurs while the paper 13 is stationary relative to the print line. On completion of a print cycle, paper 13 is advanced one or more line spaces where a new line of data may be printed. Means for feeding the paper 13 in synchronism with operation of the print mechanism are well known and would include a drive motor, not shown, or the like connected to the shafts 20 via pulleys 21 or the like of the forms feed tractors 19.

In the printer apparatus of FIG. 1, in accordance with principle of a back printer, printing occurs when the paper 13 and ink ribbon 14 are impacted against the type characters on the type elements. The impacting occurs at various print positions along the print line to thereby form a complete line of data. For this purpose, a plurality of print hammers 60 are mounted behind the print medium 13. Print hammers 60 are arranged to be uniformly spaced so that one hammer element occupies each print position along the print line and the hammers 60 are aligned in a single row parallel to the print line. Each print hammer 60, as will be more fully described hereinafter, is part of an individual hammer unit which comprises an electromagnet 40 with armature 48, a push connector element 82 with bias springs 59 which maintain the hammers 60 out of contact with the paper 13 when the electromagnet is de-energized. Each hammer 60 is individually operable and the operation of various hammers occurs selectively at random positions along the print line in accordance with instruction from a control means which comprises a type tracking device and a coacting storage device which indicates the data to be printed. Further details of a suitable control system may be more fully understood by reference to the aforesaid U.S. Patent 2,993,437 of F. M. Demer and E. J. Grenchus, for a High Speed Printer issued July 25, 1961.

In general, the above-described hammer mechanism of the present invention is the inertial type, i.e., the hammer element 60 is moving under its own momentum at the time the impact occurs. In addition, the hammer elements 60 following impact returns to a retracted position as a result of rebound caused by the impact. The momentum is applied to the hammer element 60 by an impelling operation obtained through energization of the electromagnet 40.

Figure 2:
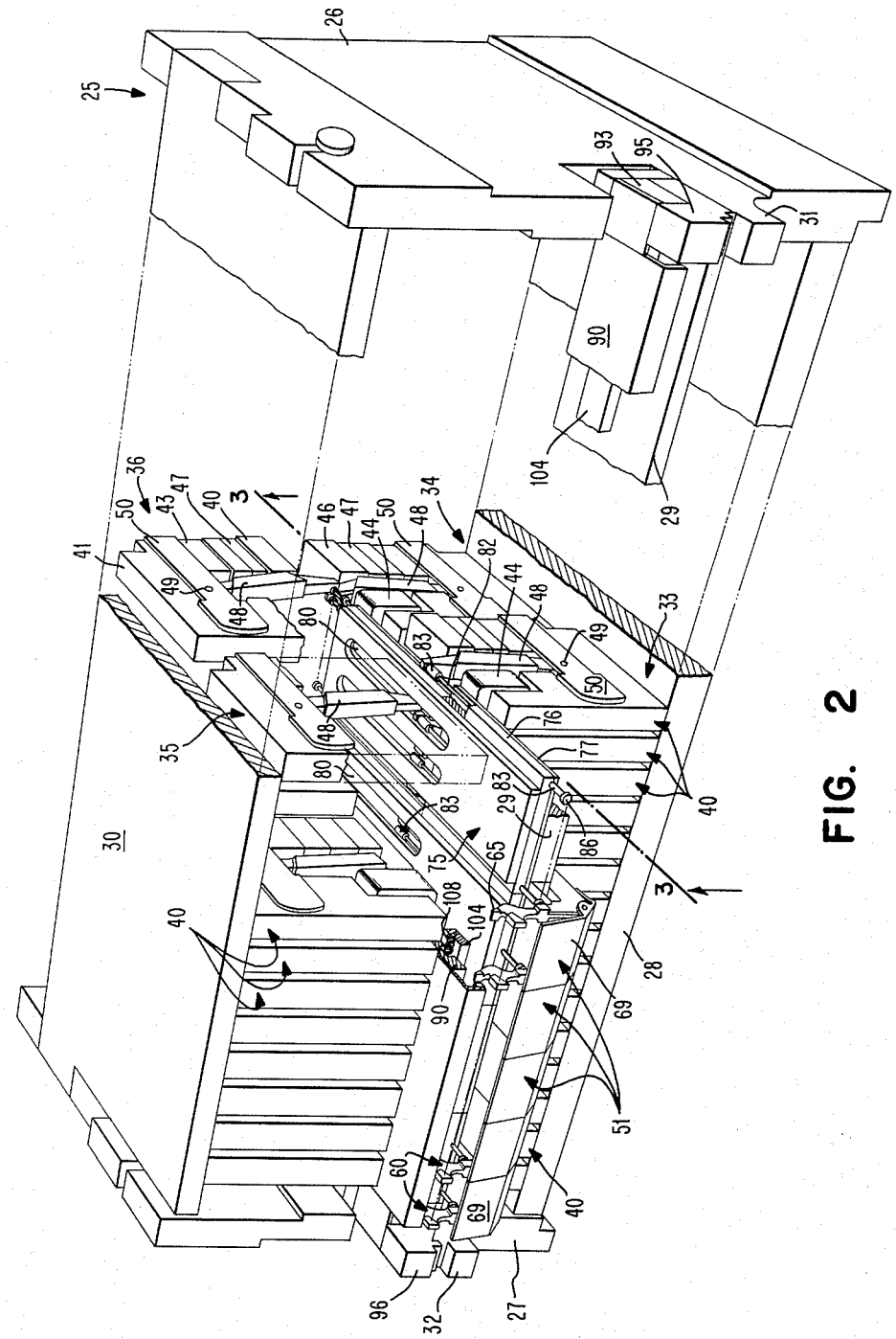
FIG. 2 is an isometric view showing a hammer mechanism assembly embodying the various features of the present invention.

Referring to FIG. 2, a unified assembly for supporting plural individual hammer units for incorporation into a printer apparatus of FIG. 1 comprises a support frame 25 having spaced vertical end members 26 and 27 between which are supported in spaced relation a lower support shelf 28, and an intermediate support shelf 29, and an upper support shelf 30. The intermediate support shelf preferably is supported on ledges 31 and 32 formed in the forward edges of the end plates 26 and 27, respectively. Plural electromagnets 40 are mounted on the upper and lower surface of the shelves 28 and 30 in such a way that their respective armatures 48 are aligned in two parallel lateral horizontally disposed rows. To accomplish this, electromagnets 40 are mounted in four linear groups. Two groups of electromagnets 40 are arranged on shelf 28 to form lower front and rear rows 33 and 34 respectively. Two additional groups of electromagnets 40 are arranged by suspension on the underside of shelf 30 to form upper front and rear rows 35 and 36. In this arrangement rows 33 and 35 are parallel and rows 36 and 37 are parallel. In each row the electromagnets 40 are uniformly spaced from each other while electromagnets 40 in the various rows 33 through 36 are offset from each other. The attachment of the electromagnets may be made in various ways but preferably are mounted by fitting the base of the electromagnet cores 41 in grooves (not shown) in the surfaces of the shelf members 28 and 30. When mounted, the armatures 48 of the electromagnets 40 on shelf 28 extend upwardly to an intermediate level behind intermediate shelf 29 and corresponding armatures 38 of electromagnets 40 supported by upper shelf member 30 extend downwardly to the same level.

Figure 4:
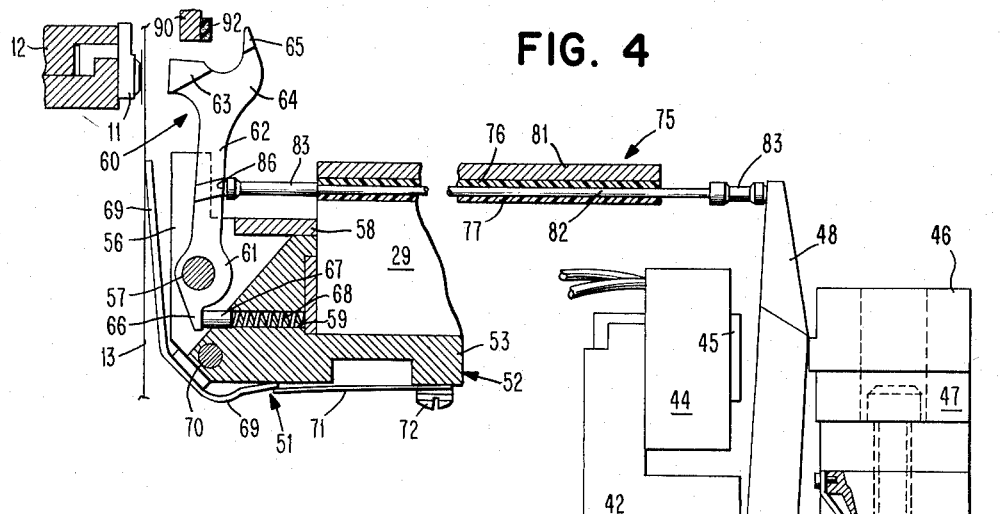
FIG. 4 is a view in side elevation showing various elements which form a basic hammer unit of the present invention with the elements illustrated in inter-operative relation at the time of rest.
Figure 5:
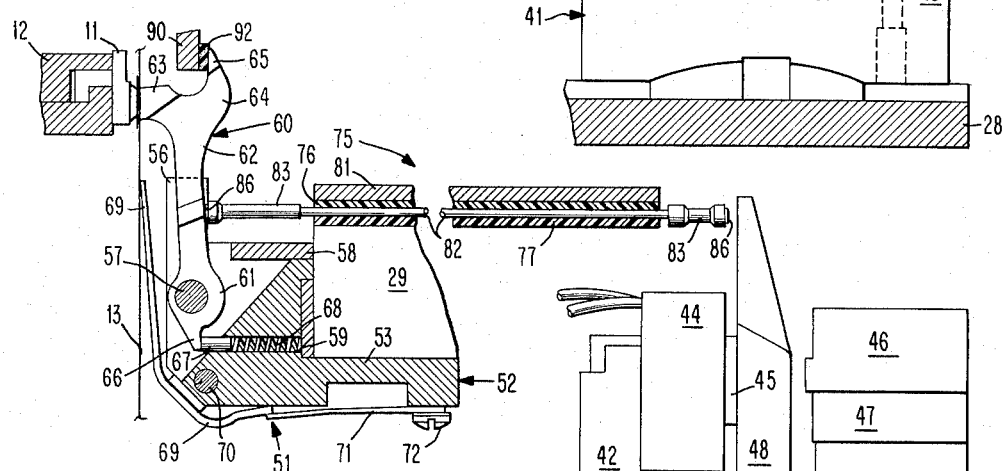
FIG. 5 is a view similar to FIG. 4 with the inter-operative relation of the various hammer unit elements illustrated at the time of impact.

As seen more clearly in FIGS. 4 and 5, the electromagnets 40 comprise a U-shaped core 41 having spaced forward and reverse legs 42 and 43, respectively. An energizing coil 44 is mounted on an inwardly extending portion 45 of the core leg 42. Superimposed on the rear leg 43 is a metal buffer block 46 and a resilient energy absorber block 47 of a material such as Butyl rubber. An armature 48 is supported pivotally by pin 49 between the legs 42 and 43 by suitable mounting means such as straps 50. The inwardly facing extention 45 of core leg 42 operates as a buffer to limit the forward stroke of armature 48. The metal block 46 and the energy block 47 serves as anti-rebound means which absorbs energy from the armature 48 when it is rotating clockwise after rebound of the hammer element 60.

Supported on the middle shelf 29 along the front edge thereof are a plurality of hammer modules 51. As best seen in FIGS. 4–7, each hammer module 51 comprises an L-shaped mounting frame 52 having a horizontal base portion 53 attachable to the underside of shelf 29 and a vertical front portion 54 extending upwardly in front of shelf 29. A plurality of recesses 55 in the forward section 54 are separated by parallel guide ribs 56. In the hammer module are mounted a subgrouping of individual hammer elements 60 pivotally mounted by a pin 57 to the vertical portion 54 within the recesses 55 between adjacent guide ribs 56. A stop plate 58 is provided to the rear of the hammer 60 for engaging the hammers when a module is removed from the unit assembly. As best seen in FIGS. 4 and 5, each hammer element 60 comprises a hub portion 61 which pivots around pin 57. Radiating upwardly from the hub portion 61 is a relatively long striking arm 62 which carries an anvil 63 near the outer extremity thereof. The anvil 63 is preferably made of hardened material such as alloy steel. The striking arm 62 terminates in a spur 64 extending rearwardly from the anvil 63 which terminates in a hook portion 65 extending outwardly beyond the anvil 63. Radiating downwardly from the hub portion 61 is a return arm 66 which engages a stud 67 carried in a biasing spring 59 located within a recess 68 in each hammer groove 55. As will be seen more clearly in FIG. 7, the arm 62 is relatively thin in relation to its width and the anvil 63 is relatively massive in order to locate the center of mass as close as possible to the center of the anvil which is the center of impact. In addition, by making the spur 64 in line with the anvil 63 and causing it to terminate at a point beyond the anvil the center of mass is additionally advanced nearer the center of impact. An L-shaped paper guide 69 is carried by the hammer module frame 52 by pivot arm 70. A spring 71 attached to the underside of frame 52 by screw 72 biases the paper guide 69 in a counterclockwise direction around the pivot pin 70.

In each hammer module 46, plural hammer elements 53 are mounted on a common pivot to a common frame 47. Thus each hammer element 53 is laterally aligned with precision with each of the hammer elements of that unit. A precision alignment of all of the hammers 53 entirely across the print line, as illustrated schematically in FIG. 1, is obtained by mounting all of the hammer modules to the shelf member 29. Such mounting can be obtained by attaching the base portion 48 of the frame 47 to the underside of shelf member 29.

Figure 3:
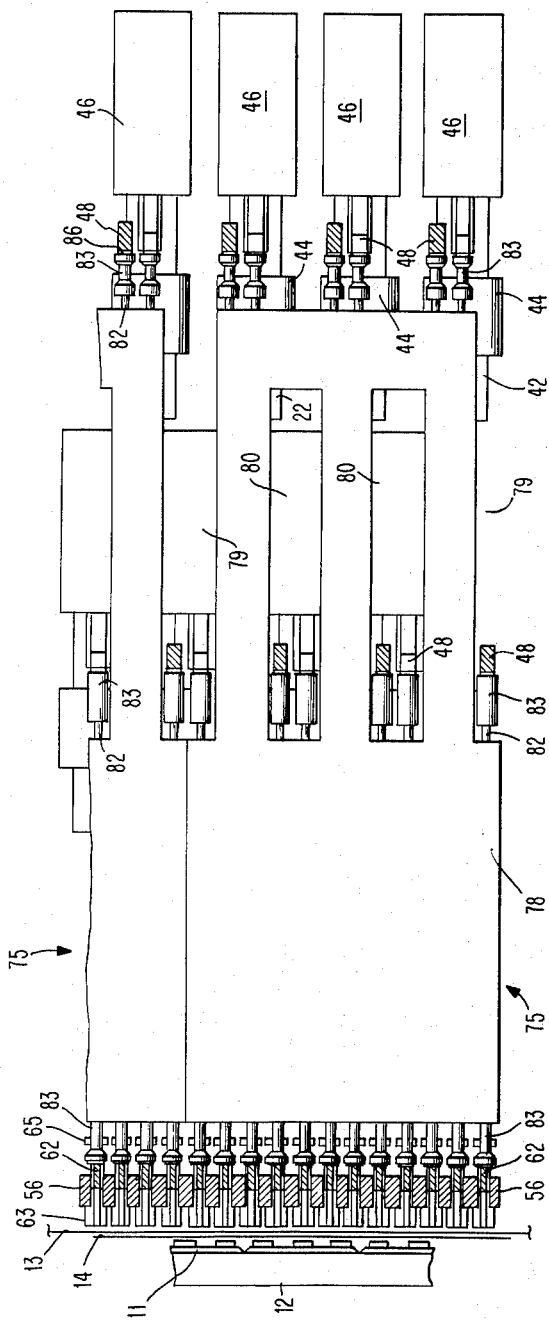
FIG. 3 is a cross section of the hammer mechanism assembly of FIG. 2 taken along the section line 3—3.

In accordance with this invention, each hammer element 60 is operatively connected to an individual electromagnet 60 by a push connector. In the assembly of FIG. 2, the various hammer elements 60 of the plurality of hammer modules 51 are connected by connector assemblies or modules 75 mounted in coplanar array on the upper surface of the middle shelf 29 and intermediate the hammer modules 51 and the electromagnets 40. As seen in FIGS. 3-5, 8 and 9, each connector module 75 comprises a plurality of push connectors in the form of slender column wire elements 82 movable supported within grooves 77 formed in one surface of a connector module block member 76. A cover plate 78 superimposed on the block member 76 coacts therewith to form laterally closed guide or support channels in the connector module 75. To accommodate the connection of various print hammers 60 to the various electromagnets 60 in the forward and reverse upper and lower rows 33-36, the push connectors 82 are of two lengths. To accommodate the interconnection of a shorter push connector 82 to armatures 48 of electromagnets 40 in the upper and lower front rows 33 and 35 respectively, each block member 76 and related cover plate 78 are provided with side edge cutouts 79 and windows 80 in the rearmost portions thereof. The grooves 77 in the block member 76 and for the shorter push connectors, of course, terminate in the cutouts 79 and windows 80 while the longer connectors reside in grooves 77 extending from the front end of the block member 76 to the extreme back edge thereof in the support portions bordering the cutouts. As best seen in FIG. 3, with two connector modules 75 mounted on shelf 29 in adjacent relationship, the edge cutouts 79 coact to form an opening for two adjacent short push connectors.

In accordance with this invention, each push connector 82 is a slender column. In the preferred embodiment, a suitable slender column comprises a fine wire element 82 of circular cross section. Each wire element 82 is of a cross-sectional dimension which assures a loose fit within the channel. The fit must be loose enough so that even with slight bends due to the fineness of the wire, binding and high frictional forces will be avoided when the wire element 82 is moved axially within the channel grooves 79. In the preferred embodiment, the desired looseness of fit is obtained by providing a groove channel 77 which has a square cross section and with a wire that is circular. A further improvement is obtained by utilizing a block member 76 and a cover plate 78 made of low friction, high strength, plastic material with a wire element formed of a high compressive strength metal such as carbon steel music wire or the like. A suitable block member material was found to be an alpha-cellulose filled melamine commonly available under the trademark of Cymel 1077 marketed by American Cyanamid Company. With such plastic materials used as the block and plate members 76 and 77 an attaching plate 81 of metal or the like is preferably superimposed on the individual connector modules when they are mounted to the shelf member 29 in order to give them greater rigidity. Preferably a separate retainer plate 81 is provided for each connector module 75 so that individual replacement and assembly of the connector modules may be practiced.

In accordance with this invention, not only do the block member 76 and cover plate 78 of the connector module support 75 guide the wire push connectors 82 they also provide lateral support which prohibits lateral deflection of the wire 82 under compressive loads from the electromagnet 40 and the hammer elements 60. While slight lateral bending may be tolerated under certain applications, looseness of fit of the push wires 82 within the channels 77 is preferably closely controlled so that virtually no lateral bending is experienced which would result in energy loss. The obtaining of a loose fit which permits the virtual elimination of bending is realized even more effectively by using the above-mentioned plastic material which gives the added advantage of minimizing friction between the wire 82 and the guide surfaces of the channel 77 and avoids fretting corrosion which is attributed to high rate reciprocations of the wire element 82 in the guide channels.

A particularly suitable arrangement for connecting the plural print hammers 60 to the corresponding electromagnets 40 in the various rows 33-36 is shown in FIG. 3. Each connector module 75 comprises an arrangement adhering to the following pattern: one short connector followed by two long connectors followed by two short connectors and two long connectors and terminating with one short connector laterally displaced parallel channels 77 along the support block 76. As previously mentioned, by making the end connector short, each module is conveniently combined with the adjacent connector modules 75 as shown in FIG. 3. In accordance with this pattern, the longer push wires occur in pairs. This gives a further advantage in that guide block and cover plate may be given greater width in the sections bordering the internal windows 80 thus providing greater structural strength and facilitating manufacture.

When the connector modules 75 are mounted on the upper surface of shelf member 29, each wire connector 82 is in accordance with this invention, maintained in position for abutting the forward and rear edges of the armature 48 of the electromagnets 40 and the hammer element 60 respectively. For that purpose each wire element of push connector 82 is fitted with terminal heads comprising a cylinder 83 of metal or the like attached to the opposite ends of the wire elements. In addition, each end cylinder carries a wear element 86 which extends beyond the end of the cylinder. To minimize friction and wear the external end surfaces of the wear inserts 86 are convex. Additional wear advantages as well as avoidance of fretting corrosion of the armatures and the hammer elements are realized when the insert was made of a rubber material such as polyurethane. Such material was also found desirable because of its ability to withstand high frequency flexure for long periods of time without heating and loss of its desirable wear properties. At the same time such material absorbed relatively small energy which would detract from the energy required by the print hammer element.

In addition to affording improved wear characteristics to the push connectors, the terminal heads 83 when attached to the wires afford a ready means for precisely controlling the length of the push wires 82. In addition, by making the end cylinders of the shorter push wires 82 slightly more massive the overall mass of the shorter push wires may be made to precisely match the mass of the longer push wires where even greater precision in the operating characteristics of the various print hammers is desired.

When mounted on the shelf members 28 and 30, the armatures 48 of the electromagnets 40 of the upper and lower forward rows 33 and 35 extend within the windows 80 of the modules 75. The arrangement is more clearly seen in FIG. 3 where the armatures 48 in cross section represent those armatures from electromagnets 40 from the lower rows 33 and 34. Those armatures 48 without cross-hatching indicate armatures 48 from electromagnets 40 in the upper rows 35 and 36. Such an arrangement, it will be seen, provides advantages in space saving. For example, referring to FIG. 3, the armatures 48 of adjacent electromagnets 40 in the lower front row 33 are separated by a space equivalent to three print positions. The space interval permits the adjacent electromagnets 40 in front row 33 to be relatively massive without overcrowding. Similarly, armatures 48 in the upper front row 35 are spaced apart by a like interval. Similar spacing is provided in the upper and lower rear rows 34 and 36 of the electromagnet 40. With such an arrangement, an additional advantage is realized in that the upper shelf member 30 and its assembly of electromagnets 40 is identical with the assembly of electromagnets 40 and shelf member 28 with the ends reversed. Thus manufacture is greatly simplified since the upper shelf 30 and its electromagnets are identical with the assembly comprised of lower shelf and its electromagnets.

Included in the print hammer mechanism assembly of FIG. 2 is an impression control device mounted between the end plates 26 and 27 of frame 25 above the intermediate shelf 29 and proximate the hooks 65 of the print hammer elements 60. The impression control device comprises a horizontal impression control bar 90 having a downward vertical overhang 91 the inside of which supports a compression pad 92 for engaging the hooks 65 of the print hammer elements. Guide blocks 93 and 94 are connected to the opposite ends of a control bar 90 and position the same within openings in the mounting blocks 95 and 96 of the intermediate shelf 29. Attached to the guide blocks 93 and 94 are camming blocks 97 and 98. A pair of springs 99 and 100 are mounted within recesses on the mounting blocks 95 and 96 respectively and bear against the guide blocks 93 and 94 respectively of the impression control plate 40 to bias it as opposite ends in a forward direction. The guide blocks 93 and 94 are slidingly retained in the grooves of the mounting blocks 95 and 96 by upper retainer plates 101, 102, 103 attached to the upper surface of said mounting blocks. The retainer plate 103 is preferably tongued to fit a groove in mounting block 96 to prevent lateral motion of the assembly.

Also supported by the mounting blocks 95 and 96 in position below the control bar 90 is an adjustor plate 104 having camming edges 105 and 106 formed on opposite ends thereof which are in contact with camming edges of the camming blocks 97 and 98 carried by the control bar 90. The adjustor plate 104 is laterally movable within the openings of the mounting blocks 95 and 96. The adjustor plate 104 is biased to the left into contact with an adjustor cam 107 mounted preferably on the frame member 25 by a compression spring 108 housed within a recess 109 of the impression control bar 90 connected at the opposite end to a peg 110 on the upper surface of the adjustor plate 104 which extends into the recess 109. When cam 107 is rotated, adjustor plate 104 moves laterally against the bias of spring on the mounting blocks. The camming edges 105 and 106 on the back of the adjustor plate 104 acting against the cam blocks 97 and 98 move the impression control bar 90 transversely to the direction of motion of the adjustor plate 104 in coaction with the compression springs 99 and 100 on the mounting blocks 95 and 96. In such an arrangement the degree of impression of the print hammer 60 on the print medium 13 and 14 may be controlled since the compression pad 92 acts to absorb a percentage of the energy imparted to the print hammer 60 by the electromagnet 40 and the push connector 82.

The operation of the print hammer mechanism of the present invention will be understood in connection with the following description by referring to FIGS. 4 and 5. While only a single print hammer unit is described, it is to be understood that the same operative principles apply to each print hammer mechanism of the assembly of FIG. 2.

Referring to FIG. 4, the print hammer mechanism is shown at the instant when coil 44 of electromagnet 45 is de-energized. Due to the force exerted by spring 68 of the print hammer module 51 against the return arm 66 of the print hammer element 60, the print hammer element 60 has been rotated clockwise out of contact with the print medium 13. The push connector 82 has been displaced laterally to the right to the point where the wear head 86 on the trailing end thereof is in contact with the front edge of the armature 48 of the electromagnet 40 which has been rotated clockwise to the point where it comes in contact with the buffer block 46. The impression control hook 65 on the uppermost extremity of arm 62 of the print hammer element 60 is displaced rearwardly from the impression control bar 90 and pad 92, by spring 68 in recess 59 in module frame 52. Spring 71 on the bottom of module frame 52 biases paper guide 69 counterclockwise against paper 13 to maintain it clear of hammer element 60. In the rest position the push connector wire element 82 is extending beyond the rear edge of the support block 76. The amount of extension is such that the extended portion of the push connector 82 constitutes a short column which is able to withstand extremely large forces in compression without bending.

When coil 44 of electromagnet 40 is energized, armature 48 is attracted toward the core extension 45 in the center of the coil 44 and rotates counterclockwise around pivot 49. Preferably, the energization of the coil 44 occurs with a relatively short high amplitude pulse which attracts the armature 48 at a rate which increases the acceleration of its motion until such time it is arrested abruptly by impact with the end of the core extension 45. During the acceleration of the armature 48 around its pivot 49 the push wire 82 is being displaced laterally toward the paper 13. Hammer element 60 at the same time is rotated in a counterclockwise direction around its pivot 57 against the bias of spring 68. Because the push connector 82 and hammer element 60 are in contact at the time the coil 44 is energized, the push wire 82 and hammer element 60 are accelerated by a pushing motion rather than a striking motion. Thus there is no impact on the wire element 82 or hammer element 60 which would tend to dissipate energy and damage the operating parts. At the instant that the armature 48 is arrested by contacting the core extension 45, the end of the armature 48 is traveling at its maximum velocity. The velocity of the push connector 82 and the print hammer element 60 will also have reached its maximum level at the same instant. The momentum of the push connector 82 and hammer at the instant when the armature 48 has been arrested is of a sufficient magnitude that both push connector 82 and the hammer element 60 continue to move toward the point of impact with the type characters. As shown in FIG. 5, the print hammer element hook has come into contact with the compression pad 92 on the impression control bar 90. At the same time the anvil 63 will have impacted the paper 13 and the ink ribbon 14 against a type character on a type element 11 moving on the stationary frame 12. The return arm 66 of the print hammer element 60 will have compressed the return spring 68 on the frame 52. As shown in FIG. 5, the push wire 82 is of sufficient length that the trailing wear head cylinder 83 does not contact the support block 76. Therefore the push wire 82 will move all the way with the print hammer element 60 to point of impact. It has been found that the mass of the push connector 82 is in the form of a slender column is so small that its translation with the hammer 60 requires very little additional energy. However, to increase the energy level of the print hammer element 60 the length of the push wire 82 may be adjusted so that the connector is interrupted in its forward motion after the armature 48 is stopped by the core extension 45 so that the print hammer 60 moves forward to point of impact under its own momentum independently of the wire element 82. The energy level of the hammer 62 in either case is of sufficient magnitude that having impacted the type 11 it rebounds at a very high rate of speed toward its rearmost position. The momentum on rebound of the hammer 62 is sufficiently great that it picks up the push wire connector 82 in the case the two have been separated and moves it rearwardly to the point where it comes in contact with the upper extremity of the armature 48. In the preferred embodiment of the present invention, the coil 44 will have been de-energized before the push connector 82 recontacts the armature 48 on its rearward stroke. The armature 48, however, will be retained in its forward position because of residual magnetism in the core 45 and in the armature 48. The residual magnetism in this case serves as a desirable means for damping the print hammer element 60 and the push connector 82 after rebound. In addition, on rebound, the push connector 82 when it contacts the armature 48 breaks it away from its position against the core extension 45 and causes it to strike against the buffer block 46 where the remaining portion of the kinetic energy in the print hammer element 60 and the push connector 82 is dissipated in the resilient block 47. The print hammer element 60 is then in position for re-energization and a subsequent operation.

Thus it will be seen that since a slender column wire element 82 is being used as a push connector, the mass of the system moved by the armature 48 has been considerably lessened. Consequently, the print hammer element 60 can be accelerated at a much greater velocity. In addition to that, the length of the armature 48 from its pivot point is considerably greater than the length of the print hammer element 60 from its pivot. In addition by abutting the wire element 82 at the free end of armature 48 and at intermediate point between anvil 63 and pivot 57 of hammer element 60 a motion amplification is realized which greatly increases the velocity of hammer element 60. It will be noted that armature 48 and print hammer element 63 are thereby interconnected as third class levers.

While the invention has been particularly shown and described with reference to a preferred embodiment thereof, it will be understood by those skilled in the art that various changes in form and details may be made therein without departing from the spirit and scope of the invention.

What is claimed is:

1. In a printer apparatus having moving type, a print hammer mechanism for striking a print medium against said type comprising in combination
    (a) a pivoted hammer element operable for striking said type,
    (b) an electromagnet operator comprising a magnetic core member and armature pivotally mounted thereon,
    (c) said armature being movable in a limited stroke by said magnetic core when energized,
    (d) means for operatively connecting said pivoted hammer element and said armature whereby said hammer element is hurled inertially against said type upon energization of said electromagnet operator comprising
    (e) a slender column push element
    (f) a stationary member slidingly supporting said push element with the ends thereof positioned for abuttingly engaging said armature and said hammer element,
    (g) said stationary member having a groove open on one side for receiving said connector with a slidable fit throughout most of its length and having a removable cover secured thereto to enclose said open side for preventing lateral bending of said push element under compressive loads applied by said hammer element and said armature,
    (h) and means operatively connected to said hammer element for biasing said hammer element, said column element and said armature into operative engagement.

2. In a high speed printer in accordance with claim 1 a print mechanism in which said armature has a substantially greater moment arm than said hammer element,
    (a) and said push element operatively engages said armature and said hammer arm in a motion amplifier arrangement, the point of engagement with the armature being more remote from the armature pivot than the point of contact with the hammer is from the hammer pivot.

3. In a high speed printer, a print mechanism in accordance with claim 2 in which said motion amplifier arrangement consists of said push element operatively engaging said armature proximate the end of said moment arm and said hammer element at a point intermediate the fulcrum and the striking end thereof.

4. In a printer apparatus having moving type, a print hammer mechanism for striking a print medium against said type comprising in combination
    (a) a print hammer arm
    (b) anvil means on said hammer arm proximate one end thereof,
    (c) means for supporting said hammer arm proximate the path of travel of said type comprising a frame member
    (d) means for pivotally attaching said hammer element to said support at a point remote from said anvil,
    (e) means for imparting inertial motion to said hammer arm comprising
    (f) a pivotable thrust arm
    (g) means for applying an activating thrust to said thrust arm at a point intermediate the fulcrum and the free end thereof,
    (h) means for connecting said thrust arm and said hammer arm in a motion amplifier arrangement comprising a push connector,
    (i) means slidingly supporting said push connector comprising a support having an open groove for receiving substantially the length of the connector with a sliding fit and having a cover enclosing said groove so that the connector is slidably supported with opposite ends engageable with the free end of said thrust arm and with said hammer at a point intermediate the anvil and fulcrum thereof, (j) and means connected to said hammer arm for biasing said hammer arm, said push connector and said thrust lever into operative engagement.

5. In a high speed printer having moving type, a print mechanism for striking a print medium against said type comprising
(a) a plurality of hammer elements arranged in a single row parallel to the motion of said type,
(b) plural operators arranged in plural rows parallel to said row of hammer elements,
(c) and means for operatively connecting said hammer elements to individual operators in said plural rows comprising
(d) a plurality of slender column wire elements, said wire elements being of different lengths
(e) means for supporting said wire elements in predetermined linear arrangement with the ends thereof abuttingly engaging individual hammer elements in said single row and individual operators in said plural rows,
(f) head means attached to the ends of said wire elements for engaging said operators and said hammer elements,
(g) said head means being of different mass for compensating for differences in mass of said wire elements.

6. In a high speed printer, a print mechanism in accordance with claim 5 in which said head means comprises
(a) a head member attached to the ends of said wire elements and a flexible wear resistant bearing element carried thereby,
(b) said flexible bearing elements being engageable with said operators and said hammer elements.

7. In a high speed printer, a print mechanism in accordance with claim 6 in which said bearing elements are polyurethane.

8. In a high speed printer apparatus having moving type, a print hammer mechanism for driving a print medium against said type comprising in combination
(a) an assembly frame;
(b) means for supporting a plurality of hammer elements in a row parallel with the line of motion of said type comprising
(c) a plurality of print hammer subassemblies individually mounted to said assembly frame,
(d) said print hammer subassemblies comprising a subassembly frame member attachable to said assembly frame,
(e) a subgroup of hammer elements pivotally mounted to said subassembly frame member,
(f) plural biasing spring elements carried by said frame member and connected to individual hammer elements;
(g) a plurality of electromagnets attached to said assembly frame,
(h) said electromagnets having armatures being arranged in forward and rearward rows parallel with said row of hammer elements;
(i) and means for operatively linking said hammer elements with various electromagnet armatures in said forward and rearward rows comprising
(j) plural push connector subassemblies individually attachable to said frame assembly
(k) said push connector subassemblies being interpositioned in coplanar array between said row of hammer subassemblies and said electromagnets.

9. In a high speed printer apparatus having moving type a printer hammer mechanism for striking a print medium against said type comprising in combination
(a) an assembly frame having spaced apart upper, lower and intermediate support shelf members;
(b) means for supporting a plurality of hammer elements arranged in a row parallel to the line of travel of said moving type comprising
(c) plural hammer subassemblies having a subassembly frame member attachable to said intermediate shelf member,
(d) and a plurality of hammer elements pivotally mounted on said subassembly frame member;
(e) a plurality of electromagnets for operating said hammer elements
(f) said electromagnets being mounted in a plurality of rows on said upper and lower shelf members,
(g) said electromagnets having armatures extending in parallel forward and rearward rows parallel with said intermediate shelf member,
(h) and means for operatively linking said hammer elements and said electromagnet armatures,
(i) said linking means comprising plural push connector subassemblies having support members attachable to said intermediate shelf member and plural push connector elements carried thereby,
(j) said push connector elements having different lengths for engaging armatures in said plural rows.

10. In a high speed printer apparatus having moving type, a print mechanism for driving a print medium against said type comprising in combination,
(a) an assembly frame,
(b) a plurality of hammer subassemblies mounted on said frame,
(c) said subassemblies having subgroups of interial hammer elements arranged in linear array,
(d) said subassemblies being mounted on said frame member with said subgroups of hammer elements aligned in a single continuous row parallel with the line of motion of said type,
(e) plural thrust operators for said hammer elements supported by said assembly frame,
said operators being arranged in plural rows parallel with said row of hammer elements,
(f) and plural connector subassemblies individually mounted on said frame,
said connector assemblies having subgroups of push connector elements operatively interpositioned between said hammer elements and said operators.

11. In a printer apparatus, a print hammer mechanism in accordance with claim 10, said mechanism including
(a) an impression control device mounted on said assembly frame comprising
(b) an impression control bar reciprocable on said assembly frame in a direction transverse to the direction of motion of said type,
(c) said control bar having impression control means coextensive with said line of hammer elements adapted to be engaged by said hammer elements coincidentally with the impact thereof against said type,
(d) and means for adjusting the position of said impression control bar for varying the line of engagement of said hammer elements therewith comprising
(e) an adjustor bar movably supported on said assembly frame adjacent said control bar,
(f) said adjustor bar being reciprocably movable longitudinally along said line of hammer elements,
(g) means for reciprocating said adjustor bar transverse to the direction of motion of said control bar,
(h) and cam means carried by said adjustor bar and said control bar for converting said longitudinal reciprocating motion of said adjustor bar to said transverse reciprocation of said control bar.

12. In a printer apparatus having moving type, a print hammer mechanism for striking a print medium against said type comprising in combination
(a) an assembly frame means
(b) a plurality of inertial hammer elements arranged in linear array on said frame means parallel with the line of motion of said type, (c) an impression control device on said frame including
(d) an impression control bar extending across the line of travel of said hammer elements engageable thereby coincidentally with impact on said type elements,
(e) said control bar being reciprocable in a direction coincident with the direction of moving of said hammer elements,
(f) an adjustor bar movably supported on said frame member adjacent said control bar,
(g) said adjustor bar being longitudinally reciprocable transverse to said direction of said control bar,
(h) means for moving said adjustor bar various amounts,
(i) and cam means carried by said adjustor bar and said control bar for converting said longitudinal motion of said adjustor bar to said transverse motion of said control bar.

13. In a high speed printer, a print mechanism for impacting a print medium with moving type comprising in combination,
(a) a support means,
(b) a plurality of striking elements arranged in a single row on said support means,
(c) plural operators arranged in plural rows on said support means parallel with said row of striking elements,
(d) means for operatively linking said striking elements to individual operators in said plural rows comprising,
(e) a plurality of slender column push connectors, said connectors being of different lengths,
(f) and means for supporting said connectors in predetermined linear arrangements with the ends thereof abuttingly engaging individual striking elements in said single row with individual operators in said plural rows.

14. In a printer apparatus, a print mechanism for impacting a print medium and moving type comprising in combination,
(a) an inertial hammer element,
(b) a thrust force generator device including a thrust member movable for a limited stroke,
(c) means for operativley linking said thrust member and said hammer element comprising,
(d) a slender column wire element,
(e) wear reduction means of a plastic composition attached to the ends of said wire elements,
(f) stationary support means for supporting said wire element in columnar manner with said wear reduction means abuttingly engaging said thrust element and said hammer element,
(g) said support means having an open groove for receiving the wire element throughout substantially its length with a sliding fit and having a cover enclosing the groove for preventing lateral bending of said wire element under compressive loads applied by said thrust lever and said hammer element,
(h) means for biasing said hammer element, said push connector and said thrust member into operative engagement.

15. In a high speed printer, a print mechanism in accordance with claim 14 in which said wear reduction means comprises
(a) a head member attached to the ends of said wire element,
(b) and flexible wear resistant bearing elements of polyurethane carried by said head member, said flexible wear resistant bearing elements having surfaces abuttingly engageable with said thrust member and said hammer element.

16. In a printer apparatus having moving type,
(a) a print hammer mechanism for striking a print medium against said type comprising in combination,
(b) an inertial hammer element,
(c) a thrust force generator device including a thrust member movable for a limited stroke in the direction of motion of said hammer element,
(d) means for operatively interconnecting said thrust member and said hammer element comprising,
(e) a selender column push connector,
(f) stationary support means slidingly supporting said push connector in columnar manner with the ends of said push connector abuttably engaging said thrust member and said hammer element,
(g) said support having an open groove for receiving the connector throughout substantially its length with a sliding fit and having a cover to enclose the groove and provide a channel within which said push connector is slidably movable with the ends thereof extending beyond said support member, said channel having wall portions engageable with said push connector intermediate the ends thereof to limit the lateral bending of said push connector under compressive loads applied by said thrust member and said hammer element whereby substantially all of the compressive thrust from said member is transmitted to said hammer elements,
(h) and means connected to said hammer element for biasing said hammer element, said push connector and said thrust member into operative engagement.

17. In a printer apparatus, a print mechanism in accordance with claim 16 in which
(a) said support means is a block member in which at least said wall portions are comprised of a low friction high strength plastic material, and
(b) said push connector is a high compressive strength metal such as carbon steel music wire or the like.

18. In a printer apparatus, a print mechanism is accordance with claim 17 in which said block member is formed of an alpha-cellulose filled melamine.

References Cited by the Examiner
UNITED STATES PATENTS

| | | | |
|---|---|---|---|
| 2,686,470 | 8/1954 | Gore et al. | 101—93 |
| 2,692,551 | 10/1954 | Potter | 101—93 |
| 2,850,907 | 9/1958 | Foster | 346—74 |
| 2,850,908 | 9/1958 | Foster | 346—74 |
| 2,874,634 | 2/1959 | Hense | 101—93 |
| 2,978,977 | 4/1961 | Eckert | 101—93 |
| 3,012,499 | 12/1961 | Amada | 101—93 |

WILLIAM B. PENN, *Primary Examiner.*